(12) United States Patent
Nielsen et al.

(10) Patent No.: US 8,965,930 B2
(45) Date of Patent: Feb. 24, 2015

(54) SYSTEMS AND METHODS OF NETWORKING ENHANCEMENTS USING LOCATION BASED SERVICES

(71) Applicant: International Business Machines Corporation, Armonk, NY (US)

(72) Inventors: Mark D. Nielsen, Austin, TX (US); Sri Ramanathan, Lutz, FL (US); Matthew A. Terry, Celebration, FL (US); Matthew B. Trevathan, Roswell, GA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/939,785

(22) Filed: Jul. 11, 2013

(65) Prior Publication Data
US 2013/0295968 A1    Nov. 7, 2013

Related U.S. Application Data

(63) Continuation of application No. 13/546,766, filed on Jul. 11, 2012, now Pat. No. 8,495,095, which is a continuation of application No. 12/759,053, filed on Apr. 13, 2010, now Pat. No. 8,285,751.

(51) Int. Cl.
| | | |
|---|---|---|
| *G06F 17/30* | (2006.01) | |
| *H04W 4/02* | (2009.01) | |
| *H04L 29/08* | (2006.01) | |
| *H04M 1/725* | (2006.01) | |

(52) U.S. Cl.
CPC ............ *H04W 4/02* (2013.01); *G06F 17/30* (2013.01); *H04L 67/18* (2013.01); *H04M 1/72577* (2013.01)

USPC .......... 707/791; 707/608; 707/609; 707/802; 707/822

(58) Field of Classification Search
CPC ...................................................... G06F 17/30
USPC ................................................... 707/600–899
See application file for complete search history.

(56) References Cited

U.S. PATENT DOCUMENTS

| | | |
|---|---|---|
| 6,968,179 B1 | 11/2005 | De Vries |
| 2004/0246146 A1 | 12/2004 | Fomukong |
| 2006/0047825 A1 | 3/2006 | Steenstra et al. |
| 2006/0195361 A1 | 8/2006 | Rosenberg |
| 2006/0229058 A1 | 10/2006 | Rosenberg |
| 2007/0072591 A1 | 3/2007 | McGary et al. |
| 2007/0244633 A1 | 10/2007 | Phillips et al. |

(Continued)

OTHER PUBLICATIONS

Letcher et al., "Large-Scale Localization from Wireless Signal Strength", 20th National Conference on . . . Intelligence Conference, 2005.

*Primary Examiner* — Isaac M Woo
(74) *Attorney, Agent, or Firm* — Matthew Chung; Roberts Mlotkowski; Safran & Cole, P.C.

(57) ABSTRACT

A location based service and method configured to provide a mechanism for information to a subscribing user. The method is implemented on a computing infrastructure and includes querying one or more databases for matching information of a third party that is associated with one or more mobile devices that pass within a predefined location at one or more predefined intervals. The method further includes providing location information to a subscribing user of the one or more mobile devices that have the matching information and pass within the predefined location.

7 Claims, 6 Drawing Sheets

(56) References Cited

U.S. PATENT DOCUMENTS

| | | |
|---|---|---|
| 2008/0032703 A1 | 2/2008 | Krumm et al. |
| 2008/0086261 A1 | 4/2008 | Robinson et al. |
| 2008/0208688 A1 | 8/2008 | Byerley et al. |
| 2009/0125230 A1 | 5/2009 | Sullivan |
| 2009/0170531 A1 | 7/2009 | Hampel et al. |
| 2009/0201896 A1 | 8/2009 | Davis et al. |
| 2011/0179158 A1* | 7/2011 | Donnelly et al. ............ 709/224 |

\* cited by examiner

SYSTEMS AND METHODS OF NETWORKING ENHANCEMENTS USING LOCATION BASED SERVICES

FIELD OF THE INVENTION

The invention generally relates to location based services and, in particular, to systems and methods for enhancing social networking systems using location based services.

BACKGROUND

Faced with an increasingly difficult challenge in growing both average revenue per user (ARPU) and numbers of subscribers, content providers such as, for example, social networking systems, and network carriers, are trying to develop a host of new products, services, and business models based on services. One such service is location-based services, which provide information specific to a location including actual locations of a user. It is expected that location based services will generate additional business for the content provider and network carriers, from both the mobile user and service providers.

For the mobile user as well as the service provider (and network carriers) and content provider, location-based services offer many opportunities. For example, location-based services can increase revenue of the service provider, e.g., content providers, while improving services to end users, e.g., mobile users. Some examples of location-based services that can be provided to the mobile user include:
  Providing the nearest business or service, such as an ATM or restaurant;
  Providing weather reports which are germane to the location where the user is using the mobile device; and/or
  Providing advertisements to end users, e.g., recipients, etc.

For the content provider and/or network carrier, location-based services provide value add by enabling services. A major issue has evolved, though, with regard to providing location based services. For example, content providers, wireless and network carriers as well as other service providers need a way to effectively and efficiently provide such services, while increasing revenue. Accordingly, there exists a need in the art to overcome the deficiencies and limitations described hereinabove.

SUMMARY

In a first aspect of the invention, a method implemented on a computing infrastructure comprises. The method comprises querying one or more databases for matching information of a third party that is associated with one or more mobile devices that pass within a predefined location at one or more predefined intervals. The method further comprises providing location information to a subscribing user of the one or more mobile devices that have the matching information and pass within the predefined location.

In another aspect of the invention, a computer program product comprises a computer usable storage medium having readable program code tangibly embodied in the storage medium. The computer program product is operable to: query one or more databases of at least one or more social networking systems or interest groups to obtain information associated with one or more users with mobile devices entering a predefined location; determine a match between the one or more users with mobile devices and a subscriber using the queried information; obtain location information of the one or more users that are matched to the subscriber; and provide the location information of the one or more matched users to the subscriber.

In another aspect of the invention, a method for providing enhancements to a social network to one or more users comprises providing a computer infrastructure. The computer infrastructure is operable to: query one or more databases of at least one or more social networking systems or interest groups to obtain information associated with one or more users with mobile devices entering a predefined location; determine a match between the one or more users with mobile devices and a subscriber using the queried information; obtain location information of the one or more users that are matched to the subscriber; and provide the location information of the one or more matched users to the subscriber.

In yet another aspect of the invention, a computer system includes a CPU, a computer readable memory and a computer readable storage media. The computer system includes first program instructions to query one or more databases for matching information of a third party that is associated with one or more mobile devices that pass within a predefined location at one or more predefined intervals. The computer system includes second program instructions to provide location information to a subscribing user of the one or more mobile devices that have the matching information and pass within the predefined location.

BRIEF DESCRIPTION OF SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
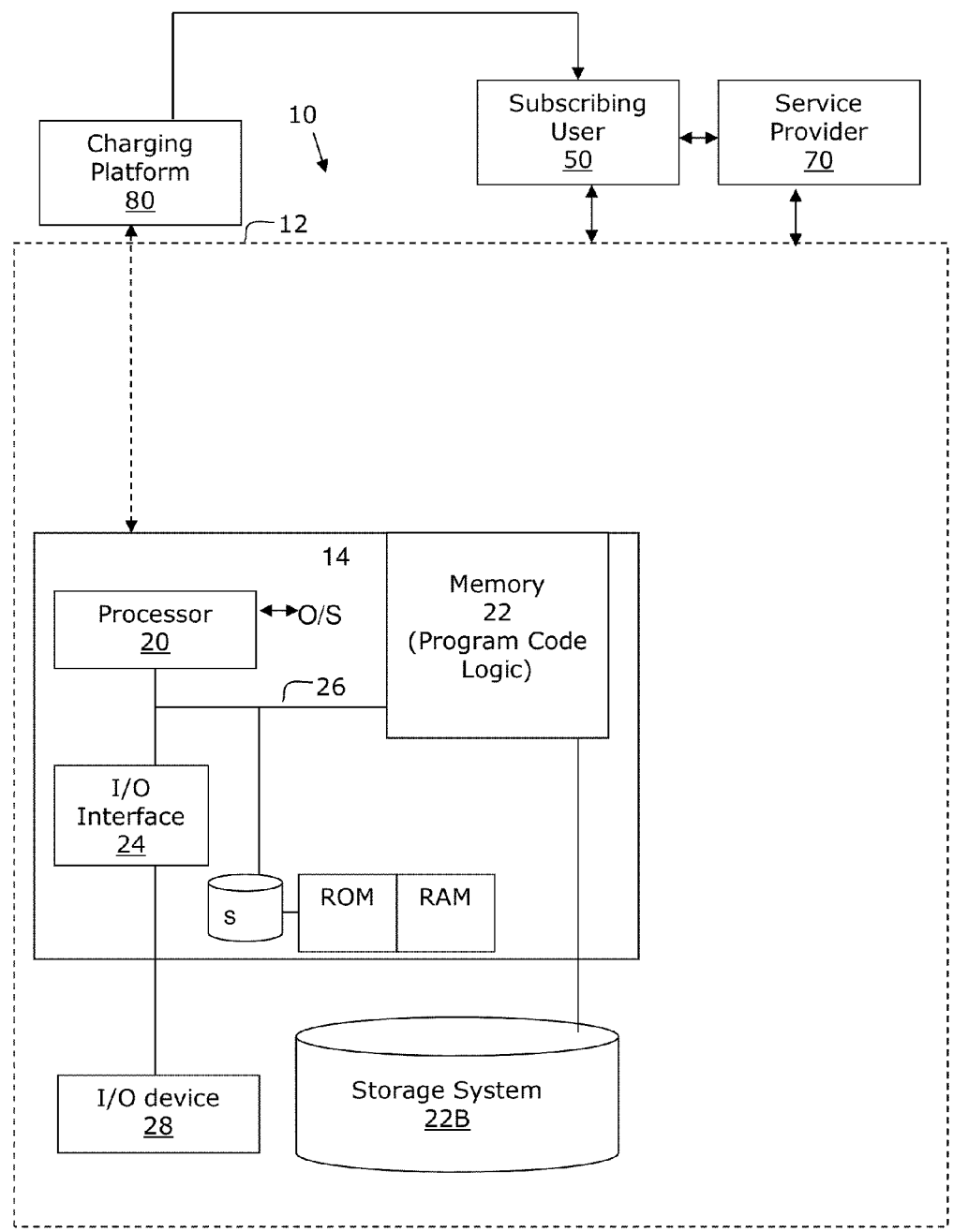
FIG. 1 shows an illustrative environment for implementing processes in accordance with the invention.

The invention generally relates to location based services and, in particular, to systems and methods for enhancing social networking systems (e.g., interest groups, etc.) using location based services. The present invention uses location based services and location, e.g., geo-boundaries, to offer a richer social networking experience for subscribers using mobile devices. More specifically, the present invention provides location information to one or more subscribers of one or more social networking systems. In embodiments, the location information is of a third party that has also subscribed to one or more of the social networking systems, in order to inform subscribers that the third party is within a certain defined location/area (e.g., geo-boundary). This allows users/subscribers/third parties (hereinafter referred to as "subscribers") of social networking systems to locate other subscribers. This, in turn, can advantageously expedite in-person (i.e., face-to-face) introductions and/or interactions.

Social networking systems allow people to socialize using the Internet. Typically, these social networking systems introduce or maintain relationships amongst subscribers with similar interests. The current limitation with these social networking systems is to keep continuity amongst its subscribers once a subscriber is away from their personal computer. Some advances have been made by offering SMS alerts to keep the subscribers updated on new information of other subscribers, and using light weight web versions of the sites accessible by mobile devices. However, these advances have their limitations, i.e., they do not provide location information of subscribers, in order to expedite in-person (i.e., face-to-face) introductions and/or interactions. The present invention thus extends these "mobile capabilities" by leveraging location based services offered by mobile telephone providers or other service providers.

As subscribers start adopting mobile devices that support richer media types, the subscriber can take the full social networking experience with them everywhere. This invention also takes advantage of the location capabilities of the next generation devices to enhance that experience by allowing subscribers to connect based on their location and the location of other subscribers. Advantageously, it is also possible to provide real time location information to a subscriber of a social networking system.

Wireless companies have the ability to determine a person's location through various mechanisms. For example, some wireless devices are GPS enabled allowing them to use satellites to determine their location. In other cases, cell tower triangulation or single cell tower location is used to determine location. For more coarse-grained depths using a web browser, an IP address lookup table correlates the IP address with a specific region. This is useful if a service does not need to know the exact location of an individual. GPS and triangulation methods can be implemented with a location platform provided by a service or content provider. In implementation, the methods and system of the present invention can take advantage of these location services in order to provide real time location information to subscribers of a service.

The present invention can use existing databases of social networking systems or create new databases. In embodiments, the present invention can be implemented by a service provider (e.g., network carrier) or one or more social networking systems. In one implementation using a service provider, for example, a subscriber can subscribe to a location based service which, in turn, will query social networking sites which are identified by the subscriber. The service provider would poll a certain, defined location for mobile devices. The service provider would then query the one or more social networking systems to find a match with the mobile devices (e.g., a device that has been identified as belonging to a third party that belongs to the same social network as the subscriber, or has one or more of the same interests as the subscriber). Once a match is found on one of the social networking systems, the service provider would then provide location information of that matching third party to the subscriber. The matching third party can also be provided with a notification to allow the third party to opt out of the service and/or be provided with location information of the subscribing user.

In another implementation using a service provider, the service provider may maintain its own database of information. In this implementation, the subscriber would provide certain information to the service provider such as, for example, identification information and interests, and/or third parties within their social network or interest groups. The identification information can be, for example, identification information of the mobile device, which can be correlated with a particular subscriber, i.e., name, telephone number, etc. The service provider would then maintain a database of such information. In this manner, the service provider can bypass the social networking systems to provide a service added value to its customers.

In yet another approach, the subscriber would provide subscription information to social networking systems (content providers). In this approach, the social networking systems would only need to request location information from the network carrier. Alternatively, the content provider can use other location systems, as discussed below, to find devices (matches) within certain locations. This approach takes advantage of existing information.

Exemplary System Environment and Infrastructure

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following:
 a portable computer diskette,
 a hard disk,
 a random access memory (RAM),
 a read-only memory (ROM),
 an erasable programmable read-only memory (EPROM or Flash memory),
 a portable compact disc read-only memory (CDROM), and/or
 an optical storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer usable program code may be transmitted using any appropriate transmission media via a network.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

More specifically, FIG. 1 shows an illustrative environment 10 for managing the processes in accordance with the invention. To this extent, the environment 10 can be representative of one or more social networking systems or interest groups, as examples. The environment 10 can also be representative of an infrastructure of a service provider. Hereinafter, the environment will be discussed with respect to a social networking system, for ease of explanation.

The environment includes a server 12. The server 12, in turn, includes a computing device 14 that can perform the processes described below. By using this computing device 14, the network carrier and/or content provider and/or service provider will not have to make any significant infrastructure investments, as the preexisting infrastructure is utilized with the present invention.

The computing device 14 and/or server 12 includes computer program code or control (program code logic) operable to make computing device 14 and/or server 12 capable of performing the services described herein, e.g., providing location information of subscribing parties. The computer program control can be implemented as one or more single purpose (dedicated) processors (CPU) that implement the computer program control. The computer program control can be one or computing modules implemented in memory 22A or directly in memory and, which is serviced and/or maintained by a service provider such as, for example, a network carrier or social networking system (content provider).

In one contemplated implementation, a subscriber 50 can subscribe to a service provider (e.g., location based service of a network carrier) 70 which, in turn, will query the databases of one or more social networking systems (or its own database) to find matches (e.g., third parties that belong to the same networking systems or have similar interests). In the implementation of querying one or more social networking systems, the service provider 70 can poll locations requested by the subscriber for every device that is entering and exiting such location. The service provider can also query the databases 22B of social networking systems (each of which can be represented by environment 10) to determine whether there are any matches amongst the polled devices, e.g., whether any of the polled devices belong to the same social network or interest group of the subscriber. Once a match is found, the service provider 70 provides the location information of the match (e.g., third parties) to the subscriber 50. The location information can be given to the subscriber 50, immediately or, alternatively, the provider can first request authorization from the "matched" third party, prior to providing the location information to the subscriber 50. The social networking systems 10 can charge the service provider 70 and/or subscribers (mobile user) 50 for its database contents using charging platform 80.

In the implementation of using its own database, for example, each subscriber 50 would provide certain information to the service provider 70 such as, for example, identification information, interests, third parties in the subscriber's network, and/or social networking subscription information. The identification information can be, for example, identification information of a mobile device, which can be correlated with a particular subscriber, i.e., name, telephone number, etc. This information would then be maintained on the database of the service provider 70. Once location and matching information is obtained, the service provider 70 will provide the location information of those matching third parties to the subscriber 50. The location information can be given to the subscriber 50 or, alternatively, the provided can first request authorization from the "matched" third party, prior to providing the location information to the subscriber 50.

In another implementation, the social networking system 10 can directly provide the services to the subscriber. In this implementation, the social networking system would query its own database 22B or databases of other social networking systems to determine if there are any matches (using the subscriber 50 provided interests, memberships in other networking systems, interests groups, etc.) The social networking system 10 would request location information from a network carrier of all devices entering and/or exiting a predefined location, and using this information would find a match. Once a match is obtained from its own database or that of other social networking systems of third parties within a certain location, (e.g., geo-boundary, requested location, or vicinity of the subscriber 50), the social networking system 10 would provide the location information to the subscriber 50 or, alternatively, first request authorization from the "matched" third party, prior to providing the location information to the subscriber 50. In this implementation, the social networking system would charge the subscriber 50 for the location information using the using charging platform 80. Additionally or alternatively, the service provider 70 can charge the social networking system 10 using charging platform 80. In still further embodiments, the other social networking systems can charge the requesting social networking system 10 for its information using the charging platform 80.

In embodiments, the service provider (e.g., location platform) 70 is configured to provide a mechanism for generating geo-boundaries and receive location information of mobile devices entering and exiting such geo-boundaries. In embodiments, the geo-boundaries may be set at any distance or interval, and at any location such as, for example, a popular restaurant. The geo-boundaries can thus be designated as any area based on coordinates that will be monitored for location enabled devices entering and exiting such boundaries. These geo-boundaries can be designated as zones of interest.

Also, in embodiments, to provide a finer granularity, geo-boundaries may be set within geo-boundaries such as, for example, several boundaries within a certain distance. As an illustrative example, multiple geo-boundaries spaced apart from one another can be set for a specific shopping mall. This will allow the system and method of the present invention to localize any matches and, more specifically, any matches to a very particular area.

By way of further example, geo-boundaries can be monitored and or created (constructed) by detecting when a third party and/or subscriber 50 is entering or passing through each boundary. In embodiments, location information of the subscriber 50 or third party can be obtained from a handset by A-GPS, GPS or through triangulation methods, all of which are methods known to those of skill in the art. As a mode of operation, as the third party traverses a set geo-boundary, a triggering event will automatically occur (e.g., the handset will be detected) at which time the location platform of the service provider 70 will obtain the location of the handset of the third party. The active devices will send a signal to the location platform of the service provider 70. In this way, the service provider 70 will detect the third party of interest as they cross the geo-boundaries, designated zones of interest or within a certain vicinity of the subscriber 50.

In further embodiments, the present invention contemplates finding a central location point for a group without using geo-boundaries. In this approach, the method relies on the ability to retrieve the current location of all users in a group and quickly average their location. Each user in the group's location is returned as a latitude number and longitude number. The following is an example to find a common location using three points; although this example can be extended to multiple points. Other known examples are also contemplated by the present invention.

By way of example, the solution breaks down into converting latitude and longitude into Cartesian coordinates of a sphere radius 1 using the following transformation for each point:

$$X=\cos(lon)*\cos(lat);$$

$$Y=\sin(lon)*\sin(lat);$$

and $$Z=\sin(lat).$$

Once the three points are converted, the system and method of the present invention can apply the cross product N=(B−A)(C−A). As should be understood by those of ordinary skill in the art, the cross product is a binary operation on two vectors in a three-dimensional Euclidean space that results in another vector which is perpendicular to the plane containing the two input vectors. In this example, the cross product:

$$=(x2-x1,y2-y,z2-z1)\times(x3-x1,y3-y1,z3-z1)$$

$$=((y2-y1)(z3-z1)-(z2-z1)(y3-y1)\ (z2-z1)(x3-x1)-\\(x2-x1)(z3-z1)(x2-x1)(y3-y1)-(y2-y1)(x3-x1)).$$

In a forth point example, it is also contemplated to look for the cross product of N=(B−A)(C−A)(D−A)

Next, the present invention converts N back to latitude and longitude. Its length is not 1, as the vectors A, B, and C were, so it is now necessary to calculate its length:

$$r=\mathrm{sqrt}(xn^2+yn^2+zn^2),$$

where xn, yn, and zn are the coordinates of N.

Finally, the latitude and longitude of the center are:

$$\mathrm{latc}=\arcsin(zn/r)$$

$$\mathrm{lonc}=\arctan(yn/xn).$$

Then, the present invention applies a tan 2(latc,lonc) which will yield two (2) possible points on earth. Then, the present invention finds the closer of the two points distance wise from the original vectors A,B,C. This will yield the midpoint of the three.

The computing device 14 also includes a processor 20, the memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and a CPU.

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a display of a wireless handheld device of the subscribing user 28.

In general, the processor 20 executes computer program code, which is stored in the memory 22A and/or storage system 22B. While executing computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the server 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, a charging platform 80 is maintained to provide charging models to charge for services rendered. The charging platform 80 may be maintained, deployed, created and/or serviced by the service provider. The charging platform 80 is designed to generate a charging record for services rendered to the subscribing user 50. In embodiments, the service provider can calculate an amount to be charged, based on many different considerations and generate the charging record to be sent to the charging platform 80. In turn, the charging platform 80 can generate an invoice and/or deduct a usage charge from an account of the subscriber 50.

In embodiments, the invention provides a business method that performs the steps of the invention on a subscription, advertising, and/or fee basis. That is, a service provider, such as a Solution Integrator or location based service, could offer to perform the processes described herein. In this case, the service provider can create, maintain, deploy, support, etc., the computer infrastructure that performs the process steps of the invention for one or more customers. The customers may be, for example, a mobile user or a third party requesting location information. In return, the service provider can receive payment from the customer(s) under a subscription and/or fee agreement and/or the service provider can receive payment from the sale of advertising content to one or more third parties.

Exemplary Geo-Boundaries

Figure 2:
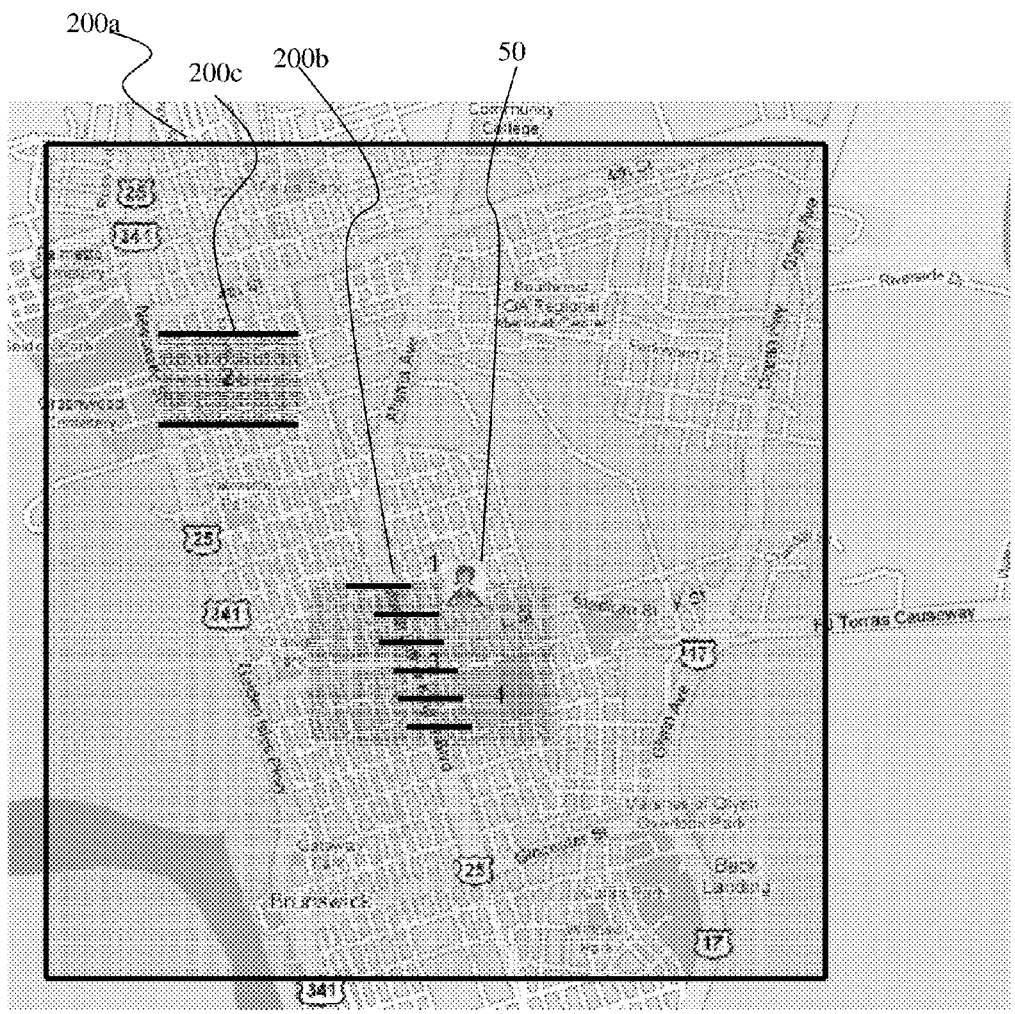
FIG. 2 shows a representative location map in accordance with aspects of the invention.

FIG. 2 shows a representative map with geo-boundaries in accordance with aspects of the present invention. The map of FIG. 2 can also be representative of certain locations requested to be monitored by the subscribing user 50 or within a certain vicinity (radius) of the subscribing user 50. In particular, the map of FIG. 2 shows a plurality of zones 200a, 200b and 200c that can be displayed to the subscribing user 50. The zones can be bounded geo-boundaries 200a, 200b and 200c, for example, a restaurant, predefined location or radius about a subscribing user 50. In embodiments, the plurality of zones 200a, 200b and 200c can be nested together (a boundary within a boundary as shown at reference numeral 200b) or remote from one another (as shown at 200b and 200c of FIG. 2), depending on the specific configuration.

In embodiments, the zones 200a, 200b and 200c can be set up by the service provider as requested by a subscribing user 50. The zones 200a, 200b and 200c can be stored in the storage system 22B or other database with other relevant information such as subscriber information, e.g., identification, interests, third parties in the subscriber's network, etc. In embodiments, the information can be updated periodically in order to change, add or otherwise modify the geo-boundaries.

Exemplary Processes

FIGS. 3-6 show exemplary processes in accordance with the present invention. The steps of FIGS. 3-6 may be implemented on the computer infrastructure of FIG. 1. The flow diagrams in FIGS. 3-6 may be illustrative of the architecture, functionality, and operation of possible implementations of systems, methods and computer program products according to various embodiments of the present invention. In this regard, each process may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the flow diagrams and combinations of the flow diagrams can be implemented by special purpose hardware-based systems that perform the specified functions or acts, or combinations of special purpose hardware and computer instructions and/or software, as described above.

Additionally, the invention can take the form of an entirely hardware embodiment, an entirely software embodiment or an embodiment containing both hardware and software elements. Software includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Figure 3:
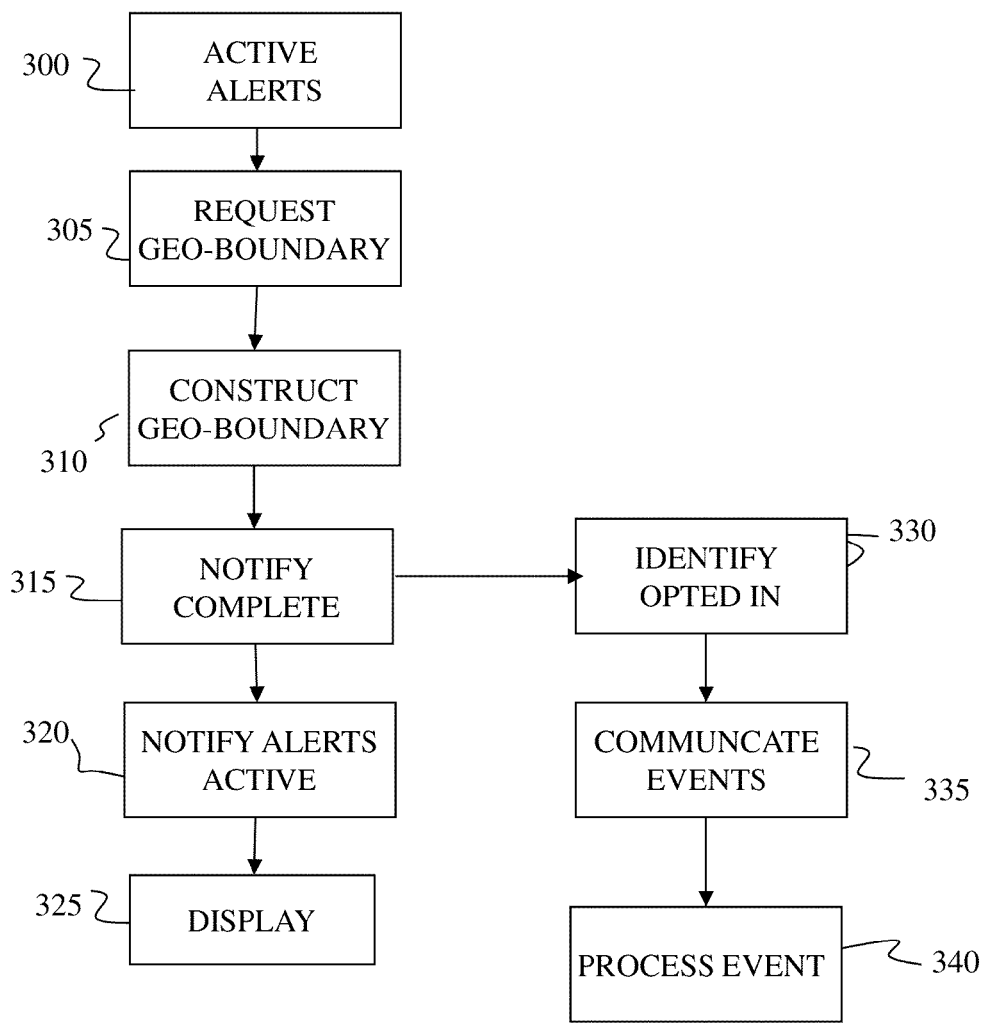
FIG. 3 is a flow diagram showing proximity alerts in accordance with aspects of the invention.

FIG. 3 shows a flow diagram for a proximity alert implementation in accordance with the invention. In embodiments, the proximity alert notifies a subscriber when someone in their social networking group (or a third party having similar interests or other matches) enters a defined radius around the subscriber. This social networking capability is implemented using the geo-boundary functionality of the network carrier's location based services (LBS) platform. In this embodiment, geo-boundaries are created by the LBS over a specific area and events are triggered when a device enters the specific area.

In one example, when a proximity alert is activated by a subscriber, the social networking system requests the LBS to construct a geo-boundary centered on the subscriber with a specific radius (e.g., 1 mile). Events are then generated by the LBS platform and sent to the social networking system anytime an "opted-in" device enters or exits the subscriber's geo-boundary. The social networking system processes the event to determine if the user entering the boundary is a member of the social networking system and if the third party and the subscriber belong to any of the same social networking groups or common interests. In embodiments, the social networking system can first process any matches and then provide such information to the LBS for active monitoring of devices that are known to be owned by a user that meets the matching criteria.

If a match is identified, both the third party and subscriber are notified and, if appropriate, location information is exchanged. The location information can be obtained by active or passive polling of user devices. For example, polling of user devices can be at a predetermined time, e.g., every 1 minute. This embodiment can be implemented using the examples discussed above, e.g., subscribing to either a service provider or content provider (e.g., social networking system).

More specifically, at step 300, a subscriber of a social network (or user group) activates a proximity alert. At step 305, the social networking system requests new geo-boundary information from the LBS and subscribes to events. At step 310, the LBS constructs a geo-boundary around the user or within a predefined location, for example. At step 315, the LBS notifies the social networking system that a geo-boundary has been set. At step 320, the social networking system notifies the subscriber that the proximity alert is activated. At step 325, the subscriber is notified of the activation by an alert such as, for example, a text message, SMS or other communication provided to the subscriber's handheld (portable) device. At step 330, the LBS identifies all opted in devices that are within the geo-boundary and which match the information provided by the subscriber. At step 335, the LBS communicates the events for each identified device. The social networking system then processes the event at step 340.

Figure 4:
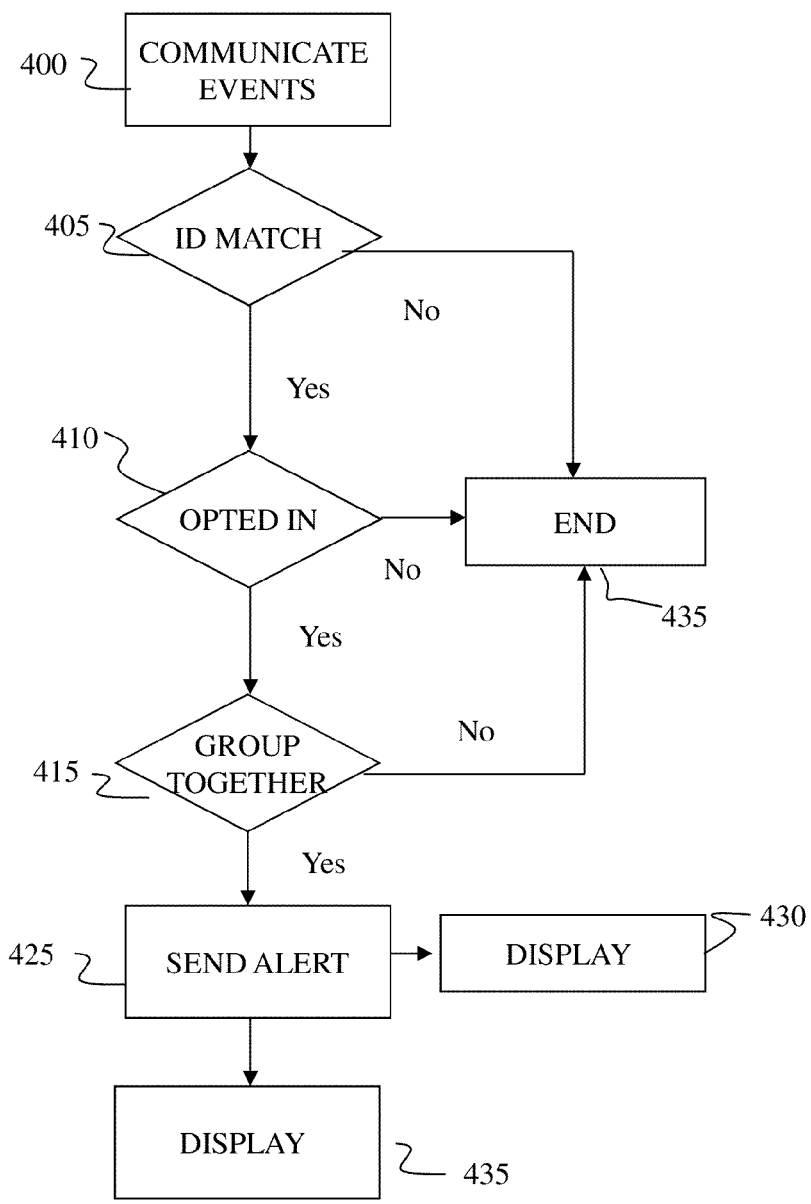
FIG. 4 is a flow diagram showing proximity events identified by a location based service in accordance with aspects of the invention.

FIG. 4 shows a flow process for processing the events in accordance with aspects of the invention. At step 400, the LBS communicates the events for each identified device to a social networking system. At steps 405, the program control determines whether the device ID matches a member of a social networking system or other party of interest. If not, the program control ends at step 435. If there is a match, at step 410, the program control of the social networking system determines whether the user (matching member) is opted in to allow proximity alerts. If not, the program control ends at step

435. If the user has opted in, at step 415, the program control of the social networking system determines if both users in the social networking system group together (or other commonality). If not, the program control ends at step 435. If the users (third party and subscriber) are grouped together, at step 420, the program control of the social networking system sends a proximity alert to both the third party (matched user) and the subscriber. At step 425, the third party receives a message that there is a match with the subscriber (other user) and that the subscriber has requested a location of the third party. If the third party has opted in, the program control, at step 435, sends a message to the subscriber that a match has been found and provides the location of the third party to the subscriber.

In additional embodiments, a proximity search can also be implemented by the present invention. The proximity search is similar to a proximity alert as discussed above, but is not persistent over a period of time. For example, the search capability relies on the same geo-boundary capability of the LBS, which is constructed and searched for all "opted-in" devices that exist in the geo-boundary immediately after its creation. Events are generated for each device and sent to the social networking platform, much like discussed above. But, as the events are generated, the geo-boundary is removed. The events are processed by the social networking system as discussed above, and can be returned to the subscriber in a single search results list.

Figure 5:
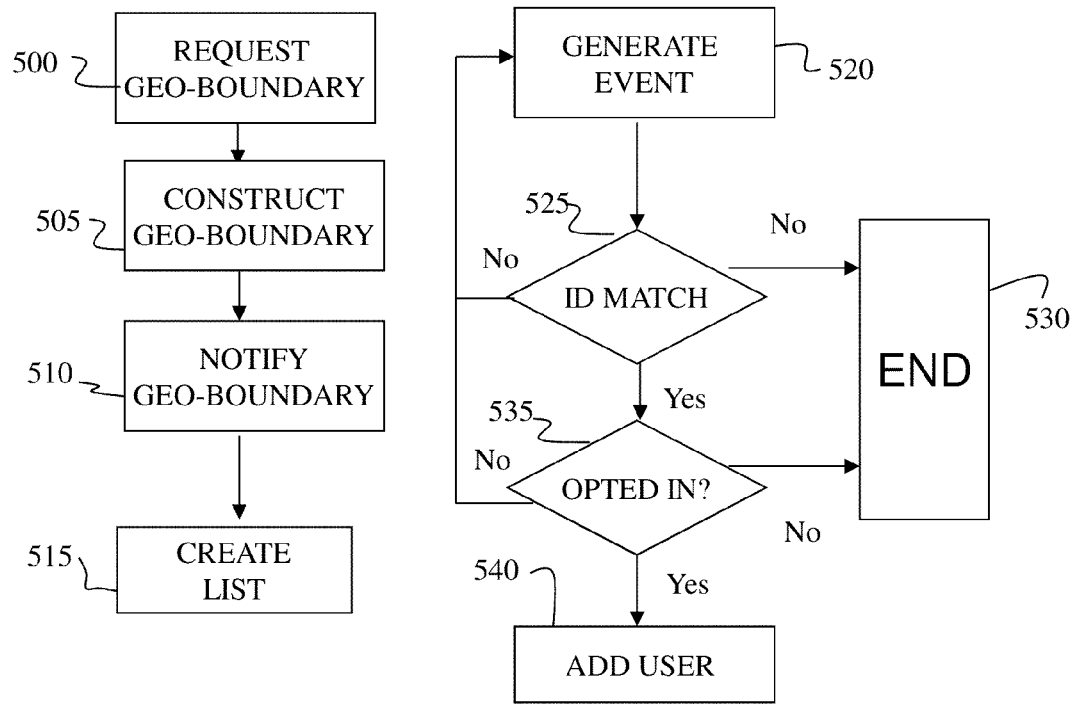
FIG. 5 is a flow diagram of vicinity matching in accordance with aspects of the invention.
Figure 5:
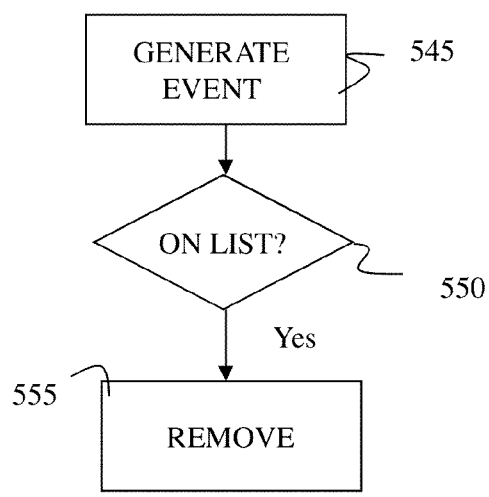

FIG. 5 shows a methodology of matching within a defined vicinity in accordance with aspects of the present invention. More specifically, this capability relies on the LBS platform's geo-boundary functionality, but the geo-boundaries are not centered on users, but rather on areas designated by the social networking system as "match-making establishments" such as a popular restaurant. In this scenario, the social networking system creates a geo-boundary around a designated location (predefined location). The system subscribes to events generated by the LBS anytime a device enters or exits the designated location. This allows the social networking system to maintain a list of devices that are in the established designated location. In this embodiment, each device is processed to determine if it belongs to a registered social networking member, which allows the social networking system to maintain a list of members within the "match-making establishment", e.g., designated location. As each member is added to the list, their profile is compared to the profile of a subscriber's list. Any matches found are then communicated to the users.

More specifically, at step 500, the program control of the social networking system requests a geo-boundary around a certain location, e.g., restaurant. At step 505, the LBS constructs the geo-boundary. In embodiments, the geo-boundary may also include a predetermined radius about the certain location. At step 510, the LBS notifies the social networking system that the geo-boundary is complete (constructed). At step 515, the program control of the social networking system creates a list of third parties to track. This step can also be implemented in any of the embodiments of the present invention.

At step 520, the LBS generates an event for each opted in device within the geo-boundary. At step 525, the program control of the social networking system determines whether the device ID matches the list. If not, the process can end at step 530 or revert back to step 520. At step 535, the program control of the social networking system determines whether the third part is opted in to the system (e.g., receiving messages and/or providing location information to the system). If not, the process can end at step 530 or revert back to step 520. If the third party is opted in, at step 540, the program control of the social networking system will add the third party to the list of members within the geo-boundary.

At step 545, the LBS generates an event for each device (third party) that exits the geo-boundary. At step 550, the program control of the social networking system makes a determination as to whether the exiting device is on the list. If so, the third party (exiting device) is removed from the list, at step 555.

Figure 6:
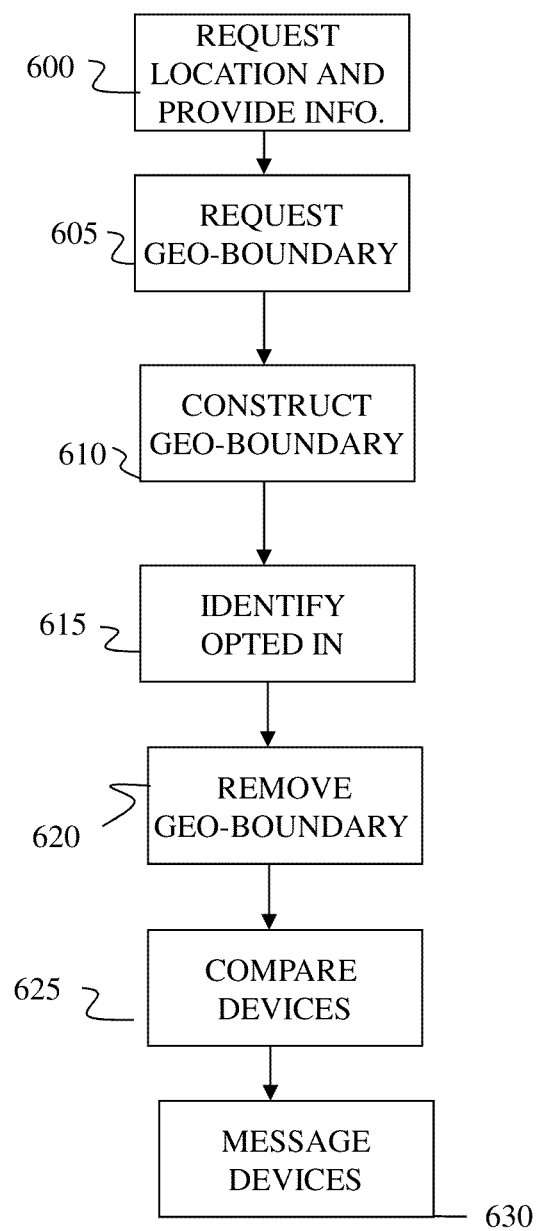
FIG. 6 is a flow diagram of group messaging with location filtering in accordance with aspects of the invention.

FIG. 6 shows a flow diagram for group messaging within a location filtering area in accordance with aspects of the present invention. More specifically, geo-boundaries are used to provide a capability that limits a group message to a subset of the group based on their location. For example, the subscriber initiating the group message identifies the full group list, a specific location, and a radius around that location to the social networking system. The social networking system requests a geo-boundary be constructed for the requested area and size. The LBS returns a list of opted-in devices within the specified area. The social networking system can then message the devices that exist in the group list and in the specified area.

In particular, at step 600, a user of a social networking system requests location filtered group messages by providing a group list, location and radius. At step 605, a program control of the social networking system requests a new geo-boundary from the LBS and subscribes to events. At step 610, the LBS constructs a geo-boundary around the subscribing user with a given radius (e.g., 1 mile). At step 615, the LBS identifies all opted in devices within the geo-boundary. At step 620, the LBS removes the geo-boundary and returns a list of devices. At step 625, the program control of the social networking system compares the device ID returned from the LBS to the device ID on the group list. If there is a match, at step 630, the program control of the social networking system provides a message to the devices that are on the group list.

In all embodiments, it should be understood that the matches can be determined by the LBS (service provider) or the program control of the social networking system, depending on the particular implementation. For example, in one implementation, the group lists (or other criteria used to match users) can be stored on the database of the social networking system, wherein the program control of the social networking system will determine if there are any matches. In another implementation, the group list (or other criteria used to match users) can be stored on the database of the LBS (service provider), wherein the program control of the LBS will determine if there are any matches. In this case, there would be no need to provide polling information of every device to the social networking system.

In further embodiments, the present invention has the capability eliminating the use of the LBS, i.e., does not require geo-boundaries. In this implementation, the system and method of the present invention will rely on the ability to retrieve the current location of all users in a group and quickly average their location. Each user in the group's location is returned as a latitude number and longitude number and can be averaged as discussed above.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof.

The corresponding structures, materials, acts, and equivalents of all means or step plus function elements in the claims, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. While the invention has been described in terms of embodiments, those skilled in the art will recognize that the invention can be practiced with modifications and in the spirit and scope of the appended claims.

What is claimed is:

1. A computing system comprising:
    a storage system configured to store one or more databases; and
    a computing device including at least one processor configured to:
        query the one or more databases to obtain information associated with one or more users with mobile devices entering a predefined location;
        determine a match between the one or more users with the mobile devices and a subscriber using the queried information;
        obtain location information of the one or more users which are matched to the subscriber;
        provide the location information of the one or more matched users to the subscriber;
        deconstruct the predefined location after providing the location information; and
        determine a central location point for the subscriber and the one or more users which are matched to the subscriber, wherein the determining of the central location point comprises:
            retrieving a location of the subscriber and the one or more users, which are matched to the subscriber; and
            averaging the locations of the subscriber and the one or more users, which are matched to the subscriber.

2. The computing system of claim 1, wherein a service provider performs the querying.

3. The computing system of claim 1, wherein a content provider receives events from a service provider that the one or more users with the mobile devices have passed within the predefined location and the content provider queries the one or more databases for the matching and sends the location information to the subscriber.

4. The computing system of claim 1, wherein the one or more databases which are queried are databases associated with one or more social networking systems or interest groups.

5. A computer program product comprising a computer usable storage medium having readable program code tangibly embodied in the storage medium, the computer program product being operable to:
    query one or more databases for matching information of one or more third parties, which is associated with one or more mobile devices, that pass within a predefined location at one or more predefined intervals;
    provide location information to a subscribing user of the one or more mobile devices associated with the one or more third parties, which have the matching information, and pass within the predefined location; and
    determine a central location point for the subscribing user and the one or more third parties, which have the matching information, wherein the determining of the central location point comprises:
    retrieving a location of the subscribing user and the one or more third parties; and
    averaging the locations of the subscribing user and the one or more third parties.

6. The computer program product of claim 5, wherein the computer program product is further operable to:
    receive from the subscribing user a request to activate a proximity alert; and
    notify the subscribing user that the proximity alert is activated.

7. The computer program product of claim 5, wherein the matching information includes the one or more third parties which are members of a same social network or interest group as that of the subscribing user.

* * * * *